United States Patent [19]
Britten

[11] 3,884,609
[45] May 20, 1975

[54] PLASTIC BLOW MOLDING MACHINE
[75] Inventor: George C. Britten, Westbury, N.Y.
[73] Assignee: Manbritt Industries, Inc., Amityville, N.Y.
[22] Filed: May 30, 1973
[21] Appl. No.: 365,171

[52] U.S. Cl. ......... 425/242 B; 425/249; 425/326 BJ; 425/DIG. 205; 425/DIG. 209; 425/DIG. 211
[51] Int. Cl. ............................................. B29d 23/03
[58] Field of Search .... 425/242 B, 246, 247, 326 B, 425/342 B, 249, 326 BJ, DIG. 205, DIG. 209, DIG. 211

[56] References Cited
UNITED STATES PATENTS

| | | | |
|---|---|---|---|
| 3,697,210 | 10/1972 | Johnson | 425/242 B X |
| 3,702,750 | 11/1972 | Veneria | 425/246 X |
| 3,726,625 | 4/1973 | Rees | 425/247 |
| 3,778,213 | 12/1973 | Di Settlembrini | 425/326 B |
| 3,799,722 | 3/1974 | Johnson | 425/242 B |
| 3,806,296 | 4/1974 | Aoki | 425/246 |

*Primary Examiner*—Frank T. Yost
*Attorney, Agent, or Firm*—Lilling & Siegel

[57] ABSTRACT

Blow molding machine for forming hollow plastic articles having a fixed platen, an opposite end plate and a vertically slideable movable platen. Tie-rods pass through the end portions of said end plate and said platens and are secured to the fixed platen and the end platen and pass through the movable platen, and at least one turn-table is disposed about a said tie-rod and is mounted between the the movable platen and the fixed platen and is slideable and rotatable on said tie-rod.

28 Claims, 8 Drawing Figures

PLASTIC BLOW MOLDING MACHINE

This invention is in plastic blow molding, and is a novel machine and method for the fast and efficient precision blow molding of hollow articles, such as bottles, out of thermoplastics.

My machine has compound interrelated vertical opening and closing, with multiple sets of core rods each of which successively cycles through the stations by intermittent operation with partial rotation of the core rod carriers while the machine is opened up vertically.

My machine enables me to produce a large volume of blow molded plastic bottles or the like rapidly, at low cost and automatically, while at the same time maintaining precision of product and reliability of machine in a manner that quite considerably surpasses what the prior art was able to accomplish.

The machine is somewhat complicated but can be sketched in broad strokes as follows.

From a fixed platen perpendicularly rise two heavy tie rods which support an end plate at the head of the machine. They hold the fixed platen and end plate together as a press frame. Lower mold halves are mounted on the fixed platen. On each tie rod is mounted a core rod holder bracket, which acts as a turntable. The turntable is mounted so it is both rotatable on the tie rod and vertically slidable on it. These turntable core rod holder brackets bear sets of protruding core rods arranged 90° apart. Between these turntables and the end plate is a movable platen, bridging the tie rods and vertically slidable on them. The upper mold halves are mounted on the under face of the movable platen.

The primary motion is the vertical reciprocating of the movable platen, with provisions being built into the machine such that at only the lower portion of the movable platen's stroke it carries the turntables (and thus the sets of core rods) up and down with it. When the turntables are at their lifted position they rotate 90° to effect the successive progression of operations.

In the preferred four-station arrangement, at the first station parisons are molded on the core rods; at the second the parisons are blown into bottles; at the third the bottles are ejected; and at the fourth cooling takes place and sensors check that all bottles have been removed from the core rods. The cooling process is made to start earlier than at the fourth station, for suiting the needs of different products and for giving high speed operation and high production output.

BRIEF DESCRIPTION OF DRAWINGS

An illustrative embodiment of my invention is shown in the drawings hereof, in which.

OVERALL STRUCTURE

This blow-molding for plastic hollow articles such as bottles rests on a base 10 which may itself be conventional. However, on that base 10 are mounted lateral ways extending approximately the full width of the machine. These ways may comprise two or more undercut channel irons 11 with their bottoms welded or otherwise solidly secured to the base 10. Way blocks 12 fit slidably in these channel irons under the re-entrant tops of the channel sides. Down from their exposed upper faces these way blocks are bored and threaded, to serve as nuts for bolts 13 extending through bores 14 in the fixed platen, which bores are internally shouldered part way down as at 15. This permits loosening the base platen and moving it and the entire frame assembly somewhat to one side or the other from center, for a purpose to be explained later herein, with the bolts for this not protruding above the upper surface of the base platen 20.

This molding press frame is formed basically by the fixed platen 20, the opposite end plate 30, and the two perpendicular tie rods 40 that pass through them and join them, together with the tie rod fastening means that secure these four parts together. Heavy tie rods nuts 41 above and 42 below the end plate secure it in place on the tie rods, which are threaded to receive these nuts. Similar nuts 43 under the fixed platen (and straddling the base) draw the fixed platen up against split rings 44 partially recessed in annular grooves 45 in the tie rods, the projecting portions of such split rings fitting in annular enlarged grooves 22 at the tops of the bores 21 in the fixed platen that the tie rods pass through. This leaves the fixed platen surface flush right up to the tie rods.

Within this press frame, and specifically on its tie rods, a movable platen 50 is vertically slidable, sliding up to open position, and down to closed position in which the mold halves are brought together and held together. Between the fixed platen 20 and the movable platen 50 are horizontal brackets 60 that hold sets of core rods. These brackets constitute turntables. These turntables are pulled up from the lower mold halves with the last portion of the upward stroke of the movable platen; with the first part of the downward stroke of the movable platen they move down to bring the core rods within the lower mold halves.

For moving the movable platen 50 up and down, a hydraulic cylinder 70 is mounted on the outside of the fixed end plate 30. This hydraulic cylinder has oil lead 71, 72 to it, a piston in it, and a piston rod 73 extending down from it through a vertical bore in the end plate and operatively connected with the movable platen for moving same.

The lower end of the piston rod is screwed into or otherwise secured to a crosshead 74 which is operatively linked to toggle mechanism, as will be described. The crosshead has side wings 75 with bores through them which ride on guide rods 76 to steady them. The upper ends of these guide rods 76 are secured to the bottom of the head plate 30. Their lower ends are secured to the bottom of the box frame 80 which is supplied for this purpose. The box frame comprises a front plate 81 and back plate 82 whose upper ends are welded to the head plate, and a bottom plate 83 secured to the front and back plates by small coupling plates 84 bolted thereto.

A pair of toggles 90 are mounted between the end plate 30 and the movable upper platen 50. One toggle is situated between the left tie rod and the central crosshead and guide rods just described. The other toggle is situated between the right tie rod and the central crosshead and guide rods. The toggles have substantial width and extend both forward and backward of the tie rods, to help maintain planer levelness of the movable upper platen.

Toggle lugs 91, 92 are fixed to the underside of the end plate 30 and the upper side of the movable platen 50 respectively, forming pivot anchors for the toggles. Pairs of toggle arms 93, 94 are journaled in these toggle lugs. The upper toggle arms 93 have integral J-extensions 95 extending inwardly from them at approximately right angles. The toggle pivot is in the heel of this J-arm, and its link pivot is in its toe. The ends of those inward extensions are pivoted to short crosshead links 96, which are pivoted to the crosshead.

THE DOWN AND UP RECIPROCATIONS

Figure 3:
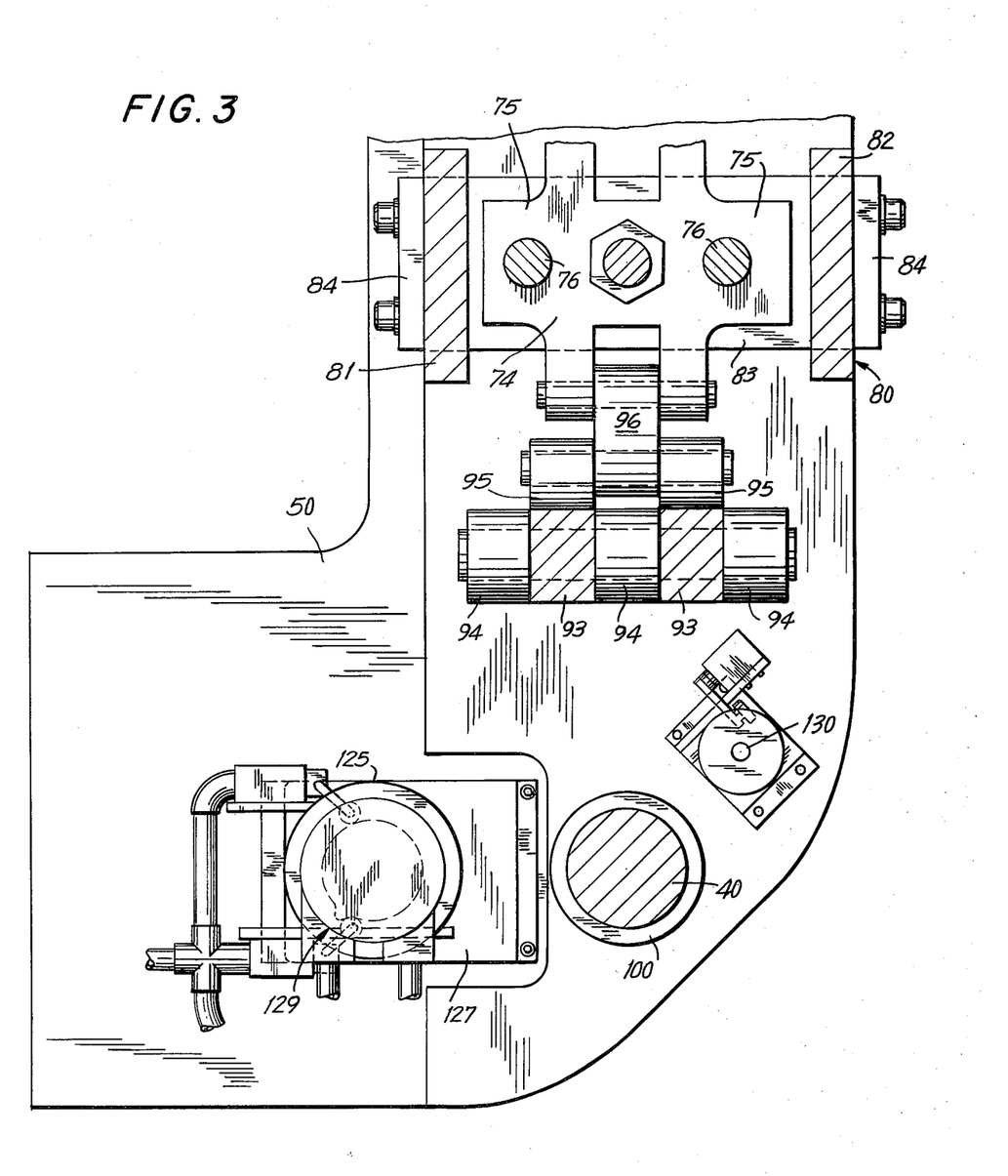
FIG. 3 is a horizontal cross-section of the upper left portion of FIG. 1, being the near half of FIG. 2, taken substantially on the line 3 — 3 of FIG. 2 with the movable upper platen in down position.

When the hydraulic cylinder is actuated and forces its piston rod down, thereby moving the crosshead down, the limited freedom of the toggle arms and links compels the toggle arms to straighten, with the J-extensions pointing in, in approximately a straight line with the crosshead links which have swung outward in the process of moving down bodily. FIG. 3 so shows these toggle parts from above.

The parts are so proportioned and positioned that when the toggle arms are straight or approximately so, the upper mold halves on the underside of the movable platen have moved against the lower mold halves on the fixed platen and are firmly held there by the toggle action.

Figure 1:
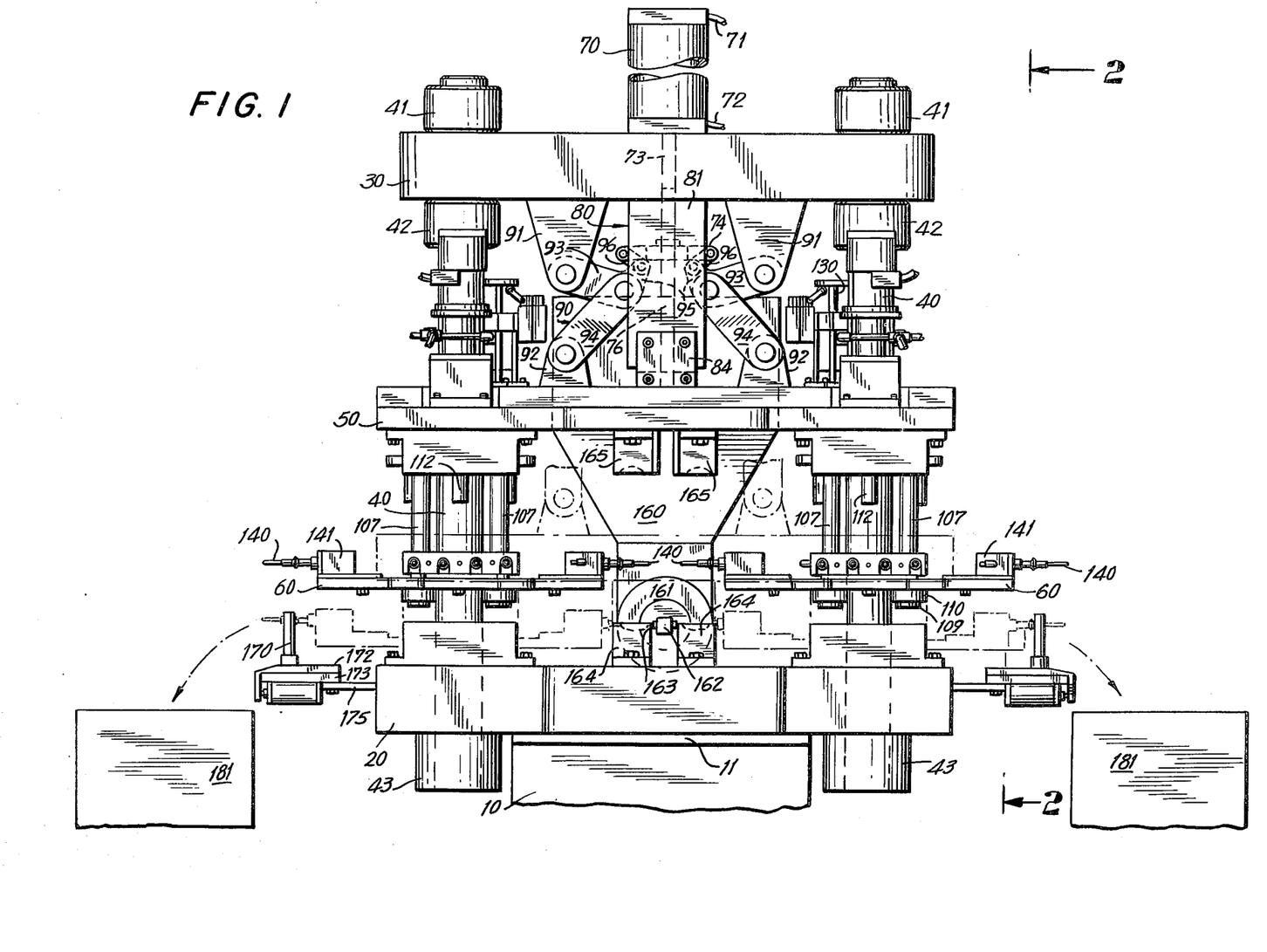
FIG. 1 is a front elevation showing the movable platen and the turntables in "up" positions in solid lines, and in "down" positions in phantom.

When it is time to re-elevate the movable platen the oil pressure in the hydraulic cylinder is reversed, the piston rod pulls the crosshead up, the toggles are pulled in their straight configuration and their arms are bent to the configuration seen in FIG. 1 in solid lines, thus bringing the movable platen 50 to its up position as seen in FIG. 1.

When the movable platen 50 is in down position and the upper and lower halves of the molds come together, the core rods fit within the mold cavities formed between the upper and lower mold halves. But when the movable platen is fully up the core rods are to be clear of both the upper and the lower mold halves. For they must be raised but to a lesser extent than the upward excursion of the movable platen and the upper mold halves which it carries. Suitable structure is provided for accomplishing this.

Figure 5:
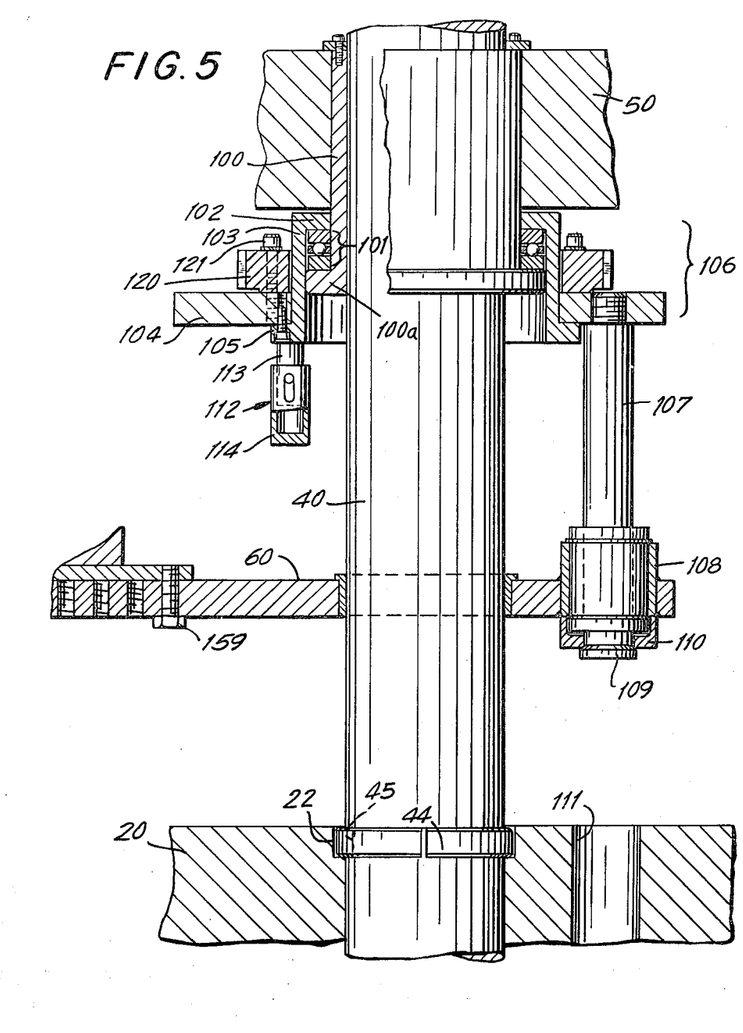
FIG. 5 is a vertical cross-section taken substantially on the line 5 — 5 of FIG. 4, with the movable platen and turntable in up positions.

As seen in FIG. 5, where each tie rod 40 passes through the movable platen 50 that platen is provided with a bearing 100 in the form of a sleeve, which projects below that platen's lower face and terminates in an outward flange 100a spaced down somewhat from the platen. Borne by that flange between it and the platen's lower face there is a ball bearing ring 101 and the inward flange 102 of a rim 103 which together with a ring 104 borne on its outward lower flange 105 constitutes a collar 106 around the tie rod, rotatable relative to the movable platen and slidable and rotatable relative to the tie rod. This collar bears four dependent core rod bracket lifters 107 in the form of rods. They engage the core rod brackets in a special way.

The core rod bracket lifter 107 pass slidably through core rod bracket bearings 108, which are in the form of sleeves. The core rod bracket lifter rods bear lower projecting adjuncts which can engage and lift the core rod brackets. The bottom of each core rod bracket lifter rod 107 has an enlarged head 109 thereon. Ringing the lifter rod above that head is the lifter cup 110. The enlarged head engages the bottom of the lifter cups, and the upper rim of the lifter cup engages the flat bottom surface of the core rod holder bracket (turntable) 60. Its engagement is outside of the bearing sleeve 108, so the repeated impacts of engaging the turntable to lift it are made against its main body and not against the implanted bearing sleeve. Also these lifting cups serve as spacer stops for the core rod holder brackets to come to rest somewhat above the surface of the fixed platen, thus leaving room for air hoses and the like in the region without having the brackets press against them. Recess bores 111 are provided in the base platen, a little larger than the lifter cups. Thus when the movable upper platen is in down position the bottom ends of the lifter rods have a clear path for a distance down from the core rod holder bracket, and they recess into these bores while the cups remain on the top surface of base platen. This also ensures that the core rod holder bracket is indexed into proper position, because otherwise the lifter rods would not find their recesses.

Figure 6:
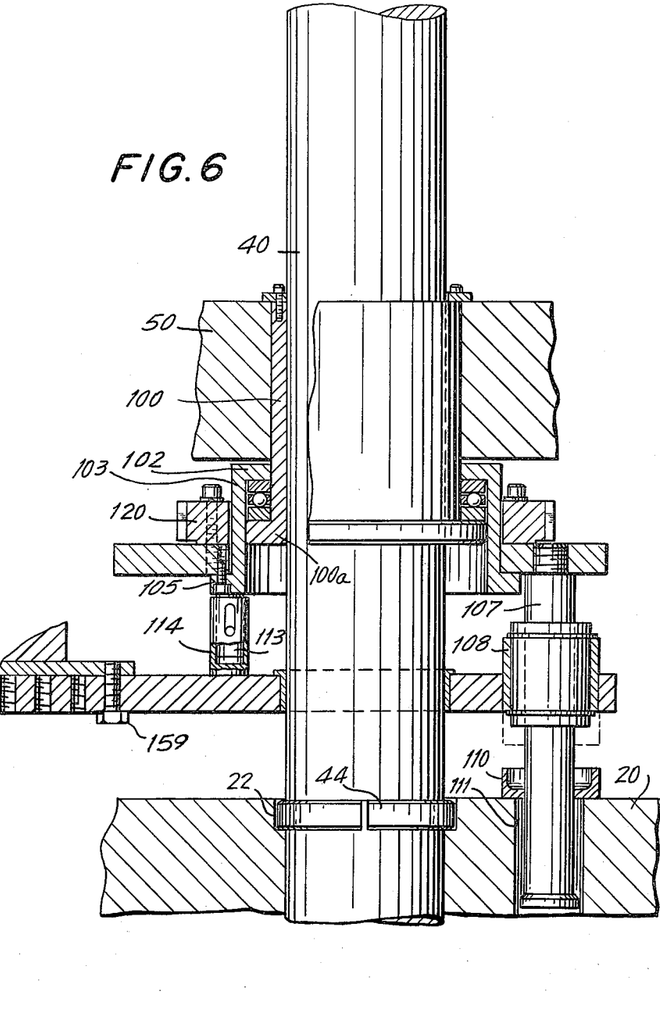
FIG. 6 is a view similar to FIG. 5 but with the movable platen and the turntable lowered.

It will thus be seen that when the movable platen goes down from its up position, at first the turntables (core rod holder brackets) hang from the movable platen and move down uniformly with it. When the movable platen has gone a portion—such as half—of its full stroke, the turntables then come to rest near the fixed platen, spaced somewhat from it by the lifter cups. In that position the core rods fit exactly into the lower mold halves which are mounted on the fixed platen. Now the movable platen continues down.

PRESS FEET

It is desirable at this stage to provide gentle yet firm assurance that the core rods become seated fully and with precision in the lower mold halves, before the powerful force of the straightening toggle arms forces the upper mold halves down upon them. This assurance is provided in the machine of my invention by a set of press feet 112. On the collar and ring that support the lifters I also provide this set of four press feet, in quadrature and intermediate the lifters. These are each made up of a small piston 113 extending down from the under side of the collar, a cylindrical shell 114 with open top and closed bottom extending down below the piston ram and fitting on it slidably, and an internal spring pressing the cylinder down. A vertical slot in each side of the cylinder receives a pin that extends laterally through the ram. Thus the cylinder slides down under pressure of the spring until the pin engages the top of the slot, and can hang there but cannot slide off. When the movable platen approaches the core rod holder brackets the cylinder contacts the latter and rises on the ram. At first the contained air easily leaves through the slot. As the slot clsoes, the air finds greater resistance to escaping, and for the remaining telescoping distance the cylinder by air pressure and/or spring pressure firmly yet resiliently presses the core rod holder brackets down into their fully seated position. Thus the core rod holder bracket is fully seated with a relatively gentle and accommodating force, and is so held, somewhat before the movable platen completes its downward excursion bringing the upper mold halves down into forceful engagement with the core rods and the lower mold halves.

When it is time to lift the movable platen and associated structure, the feed to the hydraulic cylinder is reversed, and the piston rod that extends from it now pulls upwardly on the crosshead. Through the crosshead links 96 and the J-extension 95, this upward pull swings the center pivot of the toggle arms inwardly, thus lifting the movable platen.

As the movable platen starts to rise, lifting the upper mold halves, the press feet pistons move up in their cylinders until those cylinder 114 hang loose on the pins and move up away from the core rod holder brackets. For a significant fraction of the excursion of the movable platen the turntable remains seated on the fixed platen. As the turntable lifter rods move on up and out of the recesses in the fixed platen, their enlarged heads meet and engage the lifting cups which in turn lift the core rod holder turntables including all the core rods and related structure thereon. When the movable upper platen 50 gets to the top of its stroke the core rod holder brackets (turntables) have been raised clear of the lower mold halves and are held clear intermediate them and the upper mold halves.

ROTATION

From the time that a given core rod is operated on at the first station in the machine to the time it has produced a finished bottle and is ready to repeat the cycle, several different operations need to occur. In this machine these operations are performed at different working stations which a given core rod reaches by step-wise rotation of the turntable that carries the core rods. For this stepwise rotation to occur the press must open and the core rods must be raised clear of the lower mold halves or other apparatus located at the several stations. Therefore the sub-cycle of mechanical movement is: down; perform station operations; up; rotate 90°. The complete cycle is four successive performances of this sub-cycle.

Figure 2:
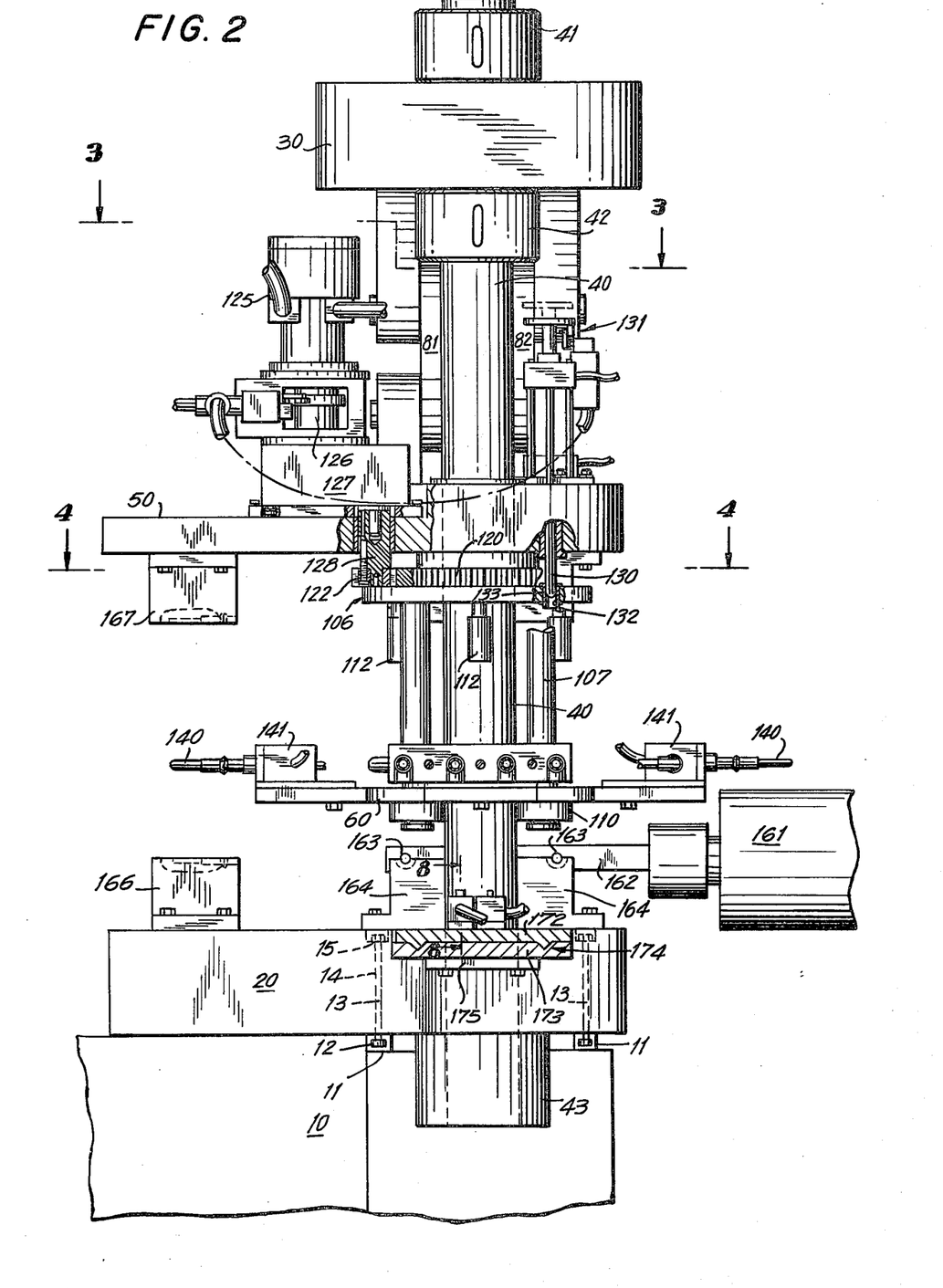
FIG. 2 is a side elevation taken substantially on the line 2 — 2 (at the right in FIG. 1), with the movable platen and the turntables in up position.
Figure 4:
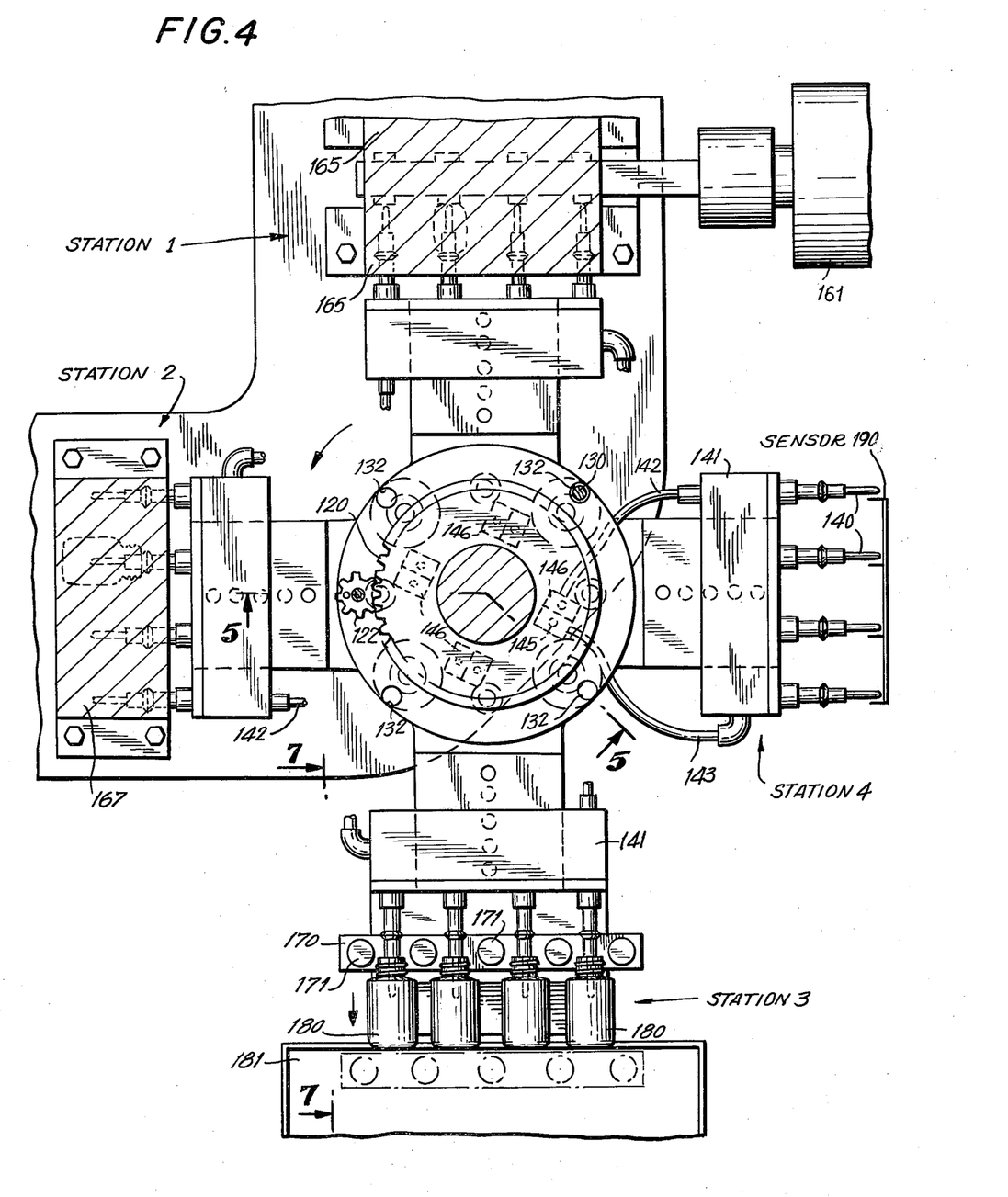
FIG. 4 is a horizontal cross-section taken substantially on the line 4 — 4 of FIG. 2. This is essentially a plan view of the left turntable.

These 90° rotational moves and the mechanism for them will now be described. The core rods lifters depending from the collar 106 are secured rigidly to that collar so that if it rotates, the turntable—which hangs from it—will rotate correspondingly. In FIG. 5 it will be seen that the collar, resting on ball bearing ring 101, can rotate about tie rod 40. A gear ring 120 is secured to the collar 106, as by bolts 121. This gear ring 120 is also shown in FIG. 2 and 4 where the engaging pinion gear 122 is also seen. When the movable platen 50 is in up position, the hydraulic rotator motor 125 is actuated and thereby rotates its shaft 126 which connects with the gear train in the indexing gear box 127 which serves as an indexing unit. The output shaft 128 of this index unit bears the pinion gear 122, which is meshed with the large ring gear 120 and rotates it 90° and thereby rotates through 90° the dependent core rod holder bracket 60 and the sets of core rods thereon. An automatic trip switch 129 shuts off the hydraulic motor when it has completed sufficient rotation to correspond to 90° rotation of the large indexing ring gear 120. The switch system is programmed to thereupon cause the shot pin 130 to move down. If the 90° advance of the collar and parts dependent from it was accurate, the shot pin will register with and enter one of the four shot pin bores 132 in collar 106 90° from each other and provided with bearing sleeves 133. A small inaccuracy of the collar in angular position can and will be rectified by the action of the tapered end of the shot pin. The moving down of the shot pin into the bore in the collar actuates a switch 131 which signals to the machine programmer that the down stroke of its movable platen may now commence. A further check on whether the 90° rotation has come to its correct rotational position is had by the fact that the down stroke is made possible to continue into its second half by the enlarged heads 109 of the core rod lifters 107 having by then found the recesses 111 and having entered them. Were they not to do so they would contact the fixed platen and hold back the toggle action while that is in its phase of low mechanical advantage.

When the up stroke has taken place the shot pin 130 is raised out of the bore 132 and its raising clear sends the signal that again actuates the indexing mechanism to advance the collar and turntable another 90°.

THE WORKING STATIONS

In this preferred embodiment of my machine, I have four working station for each of the two sides of the FIG. 8. Each of the two sides of the machine has four working stations arranged in quadrature around a tie rod. The core rod holder brackets (turntables) 60 are fashioned so that at the four positions, which are in quadrature, i.e., successively 90° from each other, they carry four sets of core rods 140 (four rods per set as shown here) which sets are also in quadrature and which protrude from the four bracket ends of the core rod holder bracket and occupy positions that precisely correspond to each other at the cardinal point locations. The sets of core rods, and also the sets of mold halves both upper and lower, are securely but adjustably fixed onto their respective carriers (as for example by bolts, seen in FIG. 5) so that as each set of core rods comes to any given working station it occupies precisely the same space as did the other sets of core rods. Thus as the turntable that carries all four sets of core rods raises, rotates 90°, and lowers again, it will fit successive sets of core rods precisely into the mold cavities or other mechanisms that are provided at the several working stations. FIG. 4, being taken at the height of the line 4 — 4 in FIG. 2, shows the upper mold halves (both parison and bottle) vertically aligned to fit the core rods and the mold lower halves.

Air (which term as used herein includes vacuum suction) is needed at the several stations. My core rods 140 preferably have neck air openings, connected to one manifold in the box 141, (which serves as core rod gang mount and double manifold) and tip air openings, connected to another manifold in the box 141. One air line 142 connects with one manifold and one air conduit hole which is a bore 144 down through the turntable, while a second air line 143 connects with the other manifold and a second such hole 145 through the turntable. These pairs of holes are in quadrature with equal radial distance and similarly oriented, to match with air supply terminals to be described.

On the upper surface of the fixed platen 20 are mounted four air feed boxes (or"air supply terminals") 146 in quadrature, radially equal, and similarly oriented. Each has, on its top, two air feed openings 147 whose locations are aligned with the air holes 145, 146 through the turntable. When the turntable lifts, rotates, and lower again, four pairs of air holes will again fit against four pairs of air feed outlets, but now differently matched. The air feeds at the several stations can differ, so a given set of core rods gets different air supplies at the successive stations, while the air supply fed to each individual station remains the same.

Figure 8:
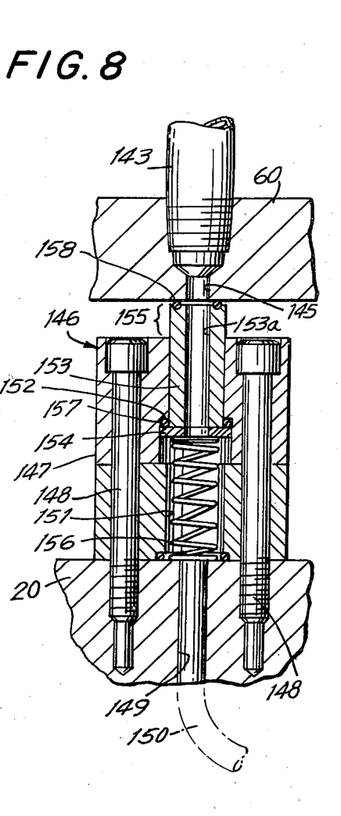
FIG. 8 is a fragmentary cross-section of an air conduit connection, taken on line 8 — 8 of FIG. 2.

The structure of the air supply terminal is detailed in FIG. 8. Seen there is a fragment of the turntable 60, and one of the holes 145 through this turntable floor. The air line 143 is seen connected to this hole. On the fixed platen 20, a fragment of which is seen is mounted an air supply terminal 146. It comprises a block or box-like structure 147 secured, as by bolts 148, to the fixed platen 20. A bore 149 comes up through the fixed platen into the under side of this box and has an air hose 150 attached to it. The box contains a vertical central passage 151 extending through it. That passage is shouldered outwardly in its mid region as at 152. A sleeve 153 with an outwardly flanged end 154 fits in this passage so as to extend up and out from same somewhat, as at 155. Its flange 154 fits under the shoulder 152, the passage giving room for same to have some downward travel. A coil spring 156 in the lower part of the passage in the box presses against the fixed platen and urges the sleeve 153 upwardly to the limit of the shoulder 152. An O ring 157 is interposed between flange 154 and shoulder 152, for sealing. Within a circular open top channel at the top of the cylinder another small O-ring gasket 158 is positioned. When the turntable is lifted the sleeve projects from the top of the box as at 155. When the turntable comes down it brings its air hole 143 directly opposite the air hole 153a through the center of the sleeve, and around that air hole the rubbery O-ring is first compressed. FIG. 8 shows the turntable having come down to almost but not quite the lower limit of its excursion. As it moves fractionally further down it continues to keep the O-ring between it and the sleeve compressed for sealing against air escape, and the accommodation of the sleeve to the final travel of the turntable is taken up by some downward travel of the sleeve bodily against the force of the coil spring.

Description of the four working stations starts in relation to the feed nozzles, which are not mounted directly on the base platen 20 but are supported from the base 10. The base 10 extends back deeper than the blow molding machine that rests on it. The base 10 also supports (visible in FIG. 1) the hopper 160 for plastic material, and the cylindrical extruder 161 which feed the plastified material into the blow molding apparatus. From the extruder a feed manifold 162 projects forward over the base platen. Along each side of this feed manifold four feed nozzles 163 are located. These are seen at the top of FIG. 4, which is a downward view of the lower portion of the right hand half of FIG. 1.

There is one set of four successive working stations around the right hand tie rod 40, and a corresponding set of four working stations around the left tie rod 14. Together these form a FIG. 8, with the first two stations approximately tangent in the center where the feed manifold serves them both.

At the first station, a set of parison lower mold halves 164 is secured to the base platen 20. These lower mold halves fit against the feed manifold, and are cut to receive and fit the lower halves of the feed nozzles. Upper mold halves 165 to complement the lower mold halves are borne on the underside of the upper movable platen 50. These lower mold halves are shaped to form parisons, each providing a mold cavity only slightly larger than the core rod. The air supply terminal 146 for Station One pulls vacuum through both air lines. Thus, as the plastified plastic is injected out from the nozzle into the parison mold, the air is evacuated from the mold cavity, giving faster and more complete feed and also avoiding formation of air bubbles in the plastic material.

When the parison has been thus injected-molded at Station One, the upper platen and the core rod holder turntable move up, and the core rod holder turntable rotates 90° to Station Two whereupon the core rod holder turntable and the upper platen move down and the upper mold halves 167 and lower mold halves 166 for Station Two are brought together. These mold cavaties are the shape and size of the finished product. The Station Two air supply terminal 146 supplies air under pressure to the manifold, and on to the core rods. A preferred example of use of air here is as follows: one air line, through one manifold connection, leads relatively high pressure air to an air outlet in the core rod 140 either at the tip or at the neck. Air under pressure thus blows the parison into a bottle. The second air line, through its separate manifold connection, leads to the other outlet in each core (in the neck or tip as the case may be). This air line is at somewhat reduced pressure, as by having a reducing valve, and it will allow air to escape out from the mold through it down to a pressure a predetermined fraction less than the first air line. The result will be that air under the higher pressure is fed in through the first air line, holds the bottle forcefully against the mold, and slowly circulates out through the second air line whose back pressure is somewhat lower. Thus the bottle is well formed and at the same time while it is in the mold an air cooling process starts for cooling both the bottle and the core rod. Now the air lines are shut off as the upper platen and the turntable start to rise, the turntable thereafter rotating to bring this set of core rods to Station Three.

Figure 7:
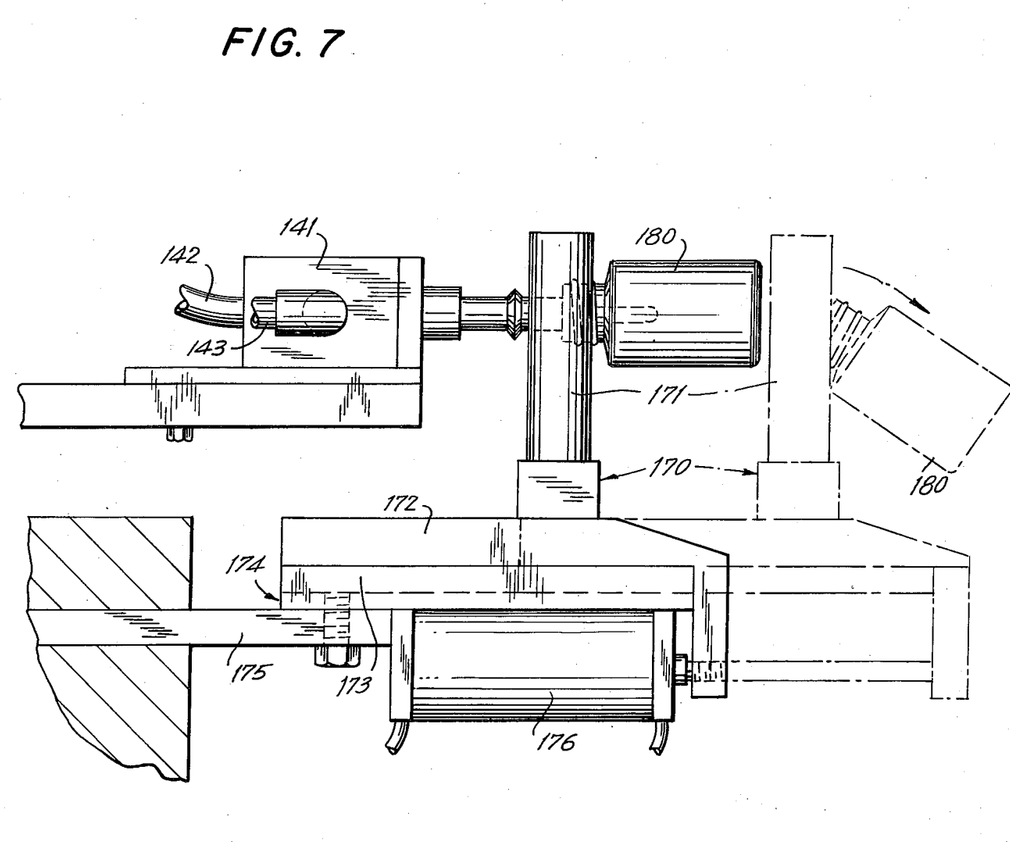
FIG. 7 is an enlarged fragmentary elevation of the ejection means, taken on line 7 — 7 of FIG. 4.

As the core rod holder turntable reciprocates downwardly at Station Three it approaches the fixed platen and brings the core rods—which are carrying finished bottles on them—down over the tines 171 of an ejector rake 170, seen at the bottom of FIG. 1, 4, and 7. These tines point up parallel to the tie rod. The ejector rake 170 is mounted on a sliding plate 172 which has a channel interfit 174 with the fixed plate 173 that attaches it to a bracket 175 extending out from the fixed platen. A hydraulic or pneumatic cylinder 176 is mounted on that bracket, with its piston attached to the sliding plate 172. This cylinder is now actuated by the programmer, whereby its piston moves the rake outwardly and ejects the bottles 180 into bins 181. Air pressure from the Station Three air supply terminal 146, felt through the core rods and inside the bottle, assists in this ejecting of the bottles. This air pressure is continued during the balance of the dwell of this set of core rods at Station Three in order to contribute to cooling of these core rods. The upper platen and the core rod holder turntable now rise, the turntable thereupon rotates, and it and the upper platen descend with this set of core rods at Station Four.

At Station Four the air lines blow air from this air line connection 146 out through the core rods for the entire dwell at this station, thus cooling the core rods. At each of Stations Three and Four the core rod cooling may involve blowing out air at either the necks or the tips of both, depending upon the requirements of the particular product being then produced on the machine. It will be appreciated that the enhanced opportunity for cooling which this machine's arrangement gives can make possible a shorter complete cycle while still producing good products free from the unwanted flow into distortions that can arise when the operation is faster than the cooling. Thus this cooling arrangement contributes directly and markedly to the economic value of the machine incorporating it. At Station Four I also subject the set of core rods to the scrutiny of a sensor 190 which detects the presence or absence of any remaining bottle or portion thereof that was not ejected from the core rod, the sensor being plugged in to stop the machine if the core rods are not clear. When the movable platen and the core rod holder turntable move up and raise the set of core rods at Station Four, the turntable rotates another 90° and lowers again, thus bringing this set of core rods back into position at Station One to start another cycle.

It will be appreciated that while this one set of four core rods has been progressing through the four working stations, as described above, each of the three other sets of core rods, which are in quadrature with the first set around the core rod holder turntables, are at the same time going through the same operations, all four sets following the same cycle simultaneously but phased apart by 90° successively.

THE FRAME IS SLIDABLE ON THE WAYS

Where the overall structure of the machine was first described, ways 11 on the base 10 and their associated parts were detailed. The purpose served by these ways is that they make possible greater adaptability of the machine to different sizes of product. When the turntables are equally spaced from the feed nozzle manifold, the maximum size of product that can be made at each of the two turntable is the same. In case it is desired to make a longer product than can be made with the feed manifold centered in the press frame, the way bolts may be loosened and the fixed platen 20 together with the entire frame and apparatus that rise therefrom can be slid along the ways to an asymmetrical position and be fixed there. In the extreme case, the machine can be slid far enough over to devote all available clearance to producing very large products on a single side. In such case the other side would be made inoperative. In intermediate cases, the machine can be slid just far enough on the ways to make on one side a product larger than could be made in symmetrical position while on the other side another product, correspondingly smaller, can be produced at the same time.

My method of blow-molding hollow plastic articles has been set forth explicitly and/or implicitly in the description of the machine and the operations carried out with its help so, to avoid prolixity, will not be repeated here in terms of method, other than in the method claims themselves.

Again to avoid prolixity, certain assumptions re-terminology are made throughout: air means transport of air under positive or negative pressure.

Up and down are used in relation to the position of the machine as illustrated. This is its preferred position but is not the only possible configuration and placement of the machine.

Hydraulic and pneumatic actuation are generally interchangeable, though in some appplications the one specified is superior to the other and is preferred.

A programmer, whether consolidated or distributed, interrelates the various successive steps of my invention, in some cases giving positive actuation and in some cases prohibiting actuation. However the available developments in the art of programmers as such is drawn upon here, and this invention is not within the programmer per se. A conventional programmer, or one routinely modified to suit, may be employed with the machine and method of my invention.

I claim:

1. Blow molding machine for forming hollow plastic articles, comprising a fixed platen, an opposite end plate, and a vertically slidable movable platen, a pair of tie rods passing through the end portions of all the foregoing and being rigidly secured to the fixed platen and the end plate and passing through the movable platen which has slidable fit thereon, and at least one turntable mounted between the movable platen and the fixed platen with a tie rod passing through it, the turntable being slidable and rotable on the tie rod.

2. Machine of claim 1 in which two turntables are provided, one on each of two tie rods.

3. Machine of claim 1 in which the turntable bears four sets of core rods, in quadrature, at its outer edges.

4. Machine of claim 1 in which the axis of the rod is the axis of rotation of the turntable; the fixed platen bears first mold halves arranged at right angles relative to said axis, the movable platen bears second mold halves similarly arranged at right angles and correspondingly positioned to mate with the first ones, which mold halves come together by reciprocation as the movable platen moves up and down, the turntable being arranged to rotate around the tie rod between the fixed and movable platens, and bearing sets of core rods which fit in between the first and lower mold halves at each of the step-wise rotative positions of the turntable.

5. Blow molding machine for forming hollow plastic articles comprising a fixed platen, an end plate, a movable platen therebetween, a pair of tie rods passing through all the foregoing and secured to the fixed platen and the end plate, a hydraulic cylinder mounted on the outside of the end plate and having a piston and a piston rod, said rod extending through said end plate and operatively connected with said movable platen for moving same; pivot anchors being provided at the opposing faces of said end plate and movable platen; and a pair of toggle arms are pivoted thereto and to each other, one toggle is provided on each side of said piston rod and the piston rod is operatively connected to said toggles; said piston rod being connected to a crosshead, whose ends are operatively connected to said toggles; the parts being so proportioned that the toggle arms are approximately straight when the movable platen is fully seated against the fixed platen; and a frame secured to and extending from the end plate at its inner face carries guide rods that interfit slidably with the crosshead to guide same in its excursion away from the end plate.

6. Blow molding machine for forming hollow plastic articles comprising a fixed platen, an end plate, a movable platen therebetween, a pair of tie rods passing through all the foregoing and secured to the fixed platen and the end plate, a pair of turn-tables, disposed between said movable platen and said fixed platen, and movable with respect to one of said tie rods passing therethrough, and a hydraulic cylinder mounted on the outside of the end plate and having a piston and a piston rod, said rod extending through said end plate and operatively connected with said movable platen for moving same.

7. Machine of claim 6 in which pivot anchors are provided at the opposing faces of the end plate and movable platen, and toggle arms are pivoted thereto and to each other, and the piston rod is operatively connected to the toggle, the parts being so proportioned that said toggle is approximately straight when the movable platen is fully seated against the fixed platen.

8. Machine of claim 7 in which there are two toggles, one to each side of the piston rod, and a crosshead is provided, the piston rod being connected to the crosshead, whose ends are operatively connected to the toggles.

9. Machine of claim 8 in which within each pair of toggle arms the one closer to the end plate is J-shape, with the pivot to the other toggle arm in its heel, and a short crosshead link connects the crosshead to a pivot in the toe of the J-shape toggle arm.

10. Blow molding machine for forming hollow plastic articles comprising two turntables approximately tangent and each bearing a plurality of sets of core rods arranged at equal angular distances about its edge and projecting out therefrom, a common feed station at the region of approximate tangency, other operating stations forming a FIG. 8, and sets of upper and lower mold halves vertically movable relative to the turntable for repetitively closing said molds about said core rods and opening same.

11. Machine of claim 10 in which lifting mechanism is provided for raising the upper mold halves, and the core rod turntables are arranged to be free of such lifting mechanism until the upper mold halves have completed a significant fraction of their excursion, core rod lifter projecting adjuncts arranged for contacting said core rod turntables and lifting same when said mechanism for lifting the upper mold halves has traveled a further distance, for lifting said core rods out of said mold lower halves.

12. In a machine for blow molding hollow objects: a fixed platen, an upwardly and downwardly movable platen opposite same, at least one upwardly and downwardly movable core rod holder therebetween, a plurality of core rod holder lifters depending from the movable platen and having projections under portions of the core rod holder and a clear path for a distance therebelow, and a stop below the core rod holder at such height as to permit same to travel down with the platen for part only of the platen's stroke, whereby the core rod holder is lifted and lowered by the movable platen during the upper portion of its stroke, stays at a rest location while the movable platen completes its downward stroke and is picked up again and raised during the course of the movable platen's up stroke.

13. Machine of claim 12 in which there are lower mold halves on the fixed platen and upper mold halves on the movable platen and the bottom of the down stroke of the movable platen occurs at the fitting together of the upper and lower mold halves.

14. Machine of claim 13 in which the rest position of the core rod holder occurs where the core rods have fit with the lower mold halves.

15. Machine of claim 12 in which the rest position of the core rod holder occurs where the core rods have fit with the lower mold halves.

16. Machine of claim 12 in which bores are provided in the core rod holder which the core rod holder lifters pass slidably through.

17. Machine of claim 16 in which there are recess bores in the fixed platen, which the lower ends of the core rod holder lifters enter in the lower portion of their downstroke.

18. Machine of claim 17 in which enlarged heads are provided at the bottom ends of the core rod holder lifters, and upwardly hollow cups ring the core rod holder lifters and have the bottom surface engaged by the enlarged head during the upstroke of the movable platen and rest on the lower platen about its recess bores during the final portion of the downstroke of the movable platen.

19. In a machine for blow molding hollow objects: a fixed platen, an upwardly and downwardly movable platen, at least one upwardly and downwardly movable core rod holder therebetween, press feet borne by the movable platen at its side toward the core rod holder, and resilient force means that resiliently press those feet against the core rod holder when the movable platen approaches its position that is closest to the fixed platen.

20. The machine of claim 19, in which a press foot includes a cylinder and a piston, a first of which is attached to the underside of the movable platen, and the other of which is movable on the first.

21. In a machine for blow molding hollow objects, a fixed platen, an end plate, an upwardly and downwardly movable platen therebetween, and at least one rotable core rod holder turntable therebetween, a tie rod passing through the movable platen and the turntable and secured to the fixed platen, a collar secured to the movable platen against any substantial movement relative thereto in the direction of the tie rod and rotable about the tie rod and positioned between the movable platen and the turntable and connected to the turntable to impart rotation thereto when it rotates.

22. Machine of claim 21 in which a drive mechanism is mounted on the movable platen on the side opposite to the collar and a drive connection extends down therefrom and engages the collar assembly to rotate same.

23. Machine of claim 22 in which the collar assembly includes a ring gear around the tie rod, and the drive connection comprises a shaft extending down through the movable platen and bearing a pinion gear which meshes with said ring gear.

24. Machine of claim 23 in which the drive train includes a switch that stops the drive when the turntable rotates a predetermined angular distance.

25. In a machine for blow molding hollow objects: a fixed platen, a tie rod secured thereto and extending perpendicular thereto, a movable platen slidable on said tie rod, and a core rod holder turntable between the two platens and slidable and rotatable on said tie rod, air conduit holes extending through said turntable at a plurality of positions corresponding to each other but angularly separated and a plurality of air supply terminals being positioned at the side of the fixed platen toward the turntable and corresponding to the air conduit holes in the turntable, whereby a given air supply terminal makes operative connections with successive air conduit holes in the turntable as the turntable goes through stepwise rotation.

26. Machine of claim 25 in which individual air supply terminals include a plurality of air connections, and each rotative step position of the turntable has a corresponding plurality of air conduit holes therethrough.

27. Machine of claim 26 in which the air conduit holes in the turntable are bores extending through the turntable and the openings of the air supply terminals bear small gaskets around the several terminal outlets which the turntable will bear against at the end of its reciprocating stroke.

28. Machine of claim 27 in which the air supply terminals include slidable sleeves resiliently urged in the direction toward the turntable and resiliently capable of being pushed back to some extent when the turntable is brought down closest to the fixed platen.

* * * * *